United States Patent
Classen et al.

(10) Patent No.: US 8,381,744 B2
(45) Date of Patent: Feb. 26, 2013

(54) WATER-CONDUCTING DOMESTIC APPLIANCE COMPRISING A DETERGENT DOSING SYSTEM AND CARTRIDGE THEREFOR

(75) Inventors: Egbert Classen, Wertingen (DE); Helmut Jerg, Giengen (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 723 days.

(21) Appl. No.: 12/311,093

(22) PCT Filed: Aug. 29, 2007

(86) PCT No.: PCT/EP2007/058994
§ 371 (c)(1),
(2), (4) Date: Jan. 6, 2010

(87) PCT Pub. No.: WO2008/034697
PCT Pub. Date: Mar. 27, 2008

(65) Prior Publication Data
US 2010/0108105 A1    May 6, 2010

(30) Foreign Application Priority Data
Sep. 19, 2006   (DE) .......................... 10 2006 043 916

(51) Int. Cl.
*B08B 3/00* (2006.01)
(52) U.S. Cl. ............ 134/99.2; 134/100.1; 134/25.2
(58) Field of Classification Search ............. 134/25.2, 134/57 D, 58 D, 56 D, 99.2, 100.1; 222/81; 68/17 R, 207 R
See application file for complete search history.

(56) References Cited

U.S. PATENT DOCUMENTS

| | | | | |
|---|---|---|---|---|
| 5,133,487 A * | 7/1992 | Russi | ............................ | 222/651 |
| 6,138,693 A * | 10/2000 | Matz | ............................ | 134/57 D |
| 2002/0088502 A1 * | 7/2002 | Van Rompuy et al. | ............ | 141/1 |
| 2007/0144558 A1 * | 6/2007 | Classen et al. | .................. | 134/18 |
| 2009/0044575 A1 | 2/2009 | Brandt et al. | | |

FOREIGN PATENT DOCUMENTS

| | | |
|---|---|---|
| DE | 1938198 U | 5/1966 |
| DE | 102005059343 A1 | 6/2007 |
| DE | 102005061801 A1 | 6/2007 |
| EP | 1281346 A1 * | 2/2003 |
| WO | WO 0220893 A1 * | 3/2002 |
| WO | 0229150 A1 | 4/2002 |
| WO | WO 2005058126 A1 * | 6/2005 |

* cited by examiner

*Primary Examiner* — Alexander Markoff
(74) *Attorney, Agent, or Firm* — James E. Howard; Andre Pallapies

(57) ABSTRACT

A water-conducting domestic appliance, in particular a domestic dishwasher, the water-conducting domestic appliance including a washing compartment for receiving items therein that are to be subjected to a handling process by the water-conducting domestic appliance; and a detergent dosing system, the detergent dosing system having a detergent dispenser with a receiving compartment, the receiving compartment for receiving at least one cartridge that is configured to hold at least one detergent. The detergent dosing system is formed from a plurality of housing walls and at least one portion of at least one housing wall of the detergent dosing system has thermal insulation.

19 Claims, 5 Drawing Sheets

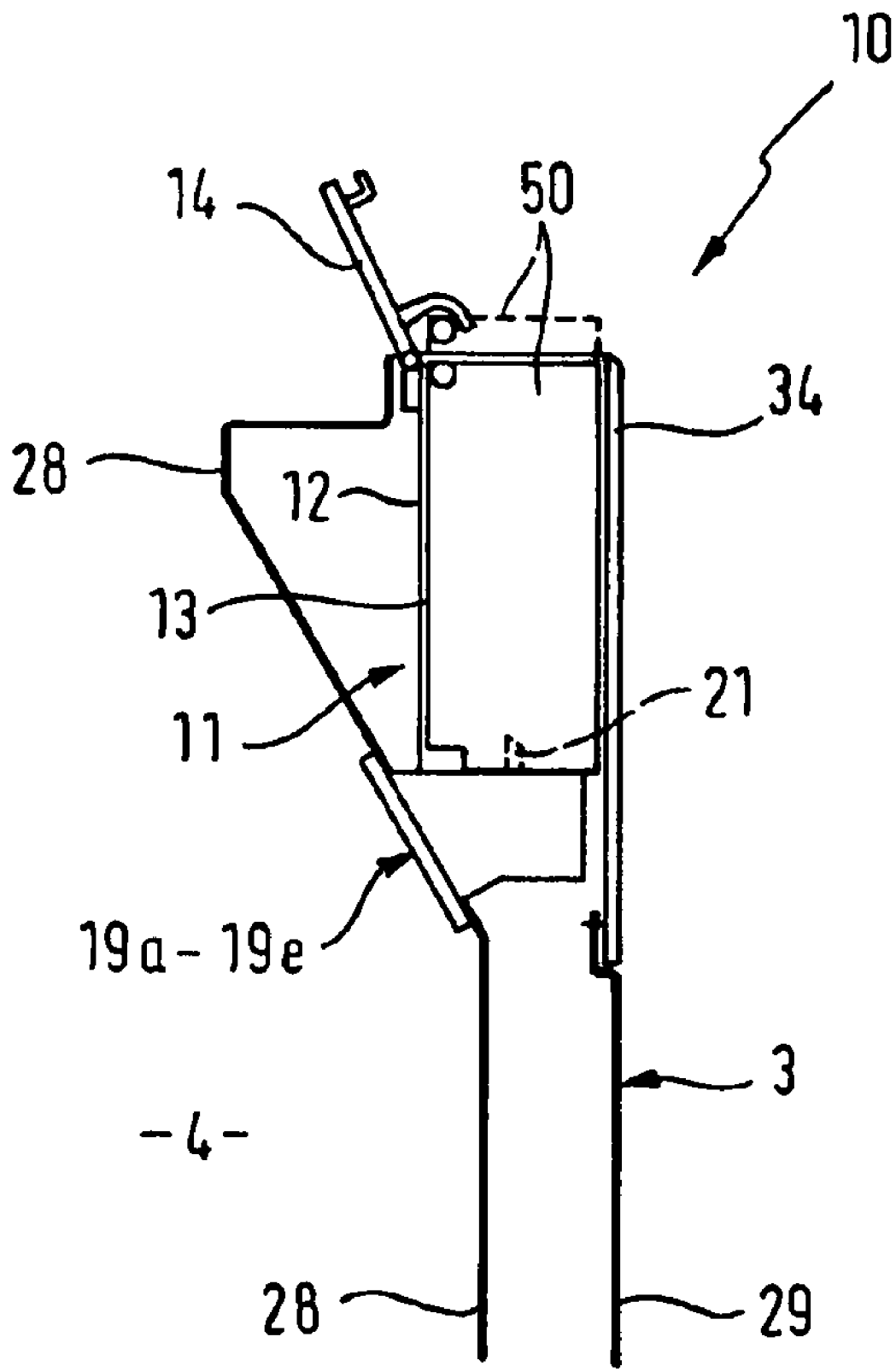

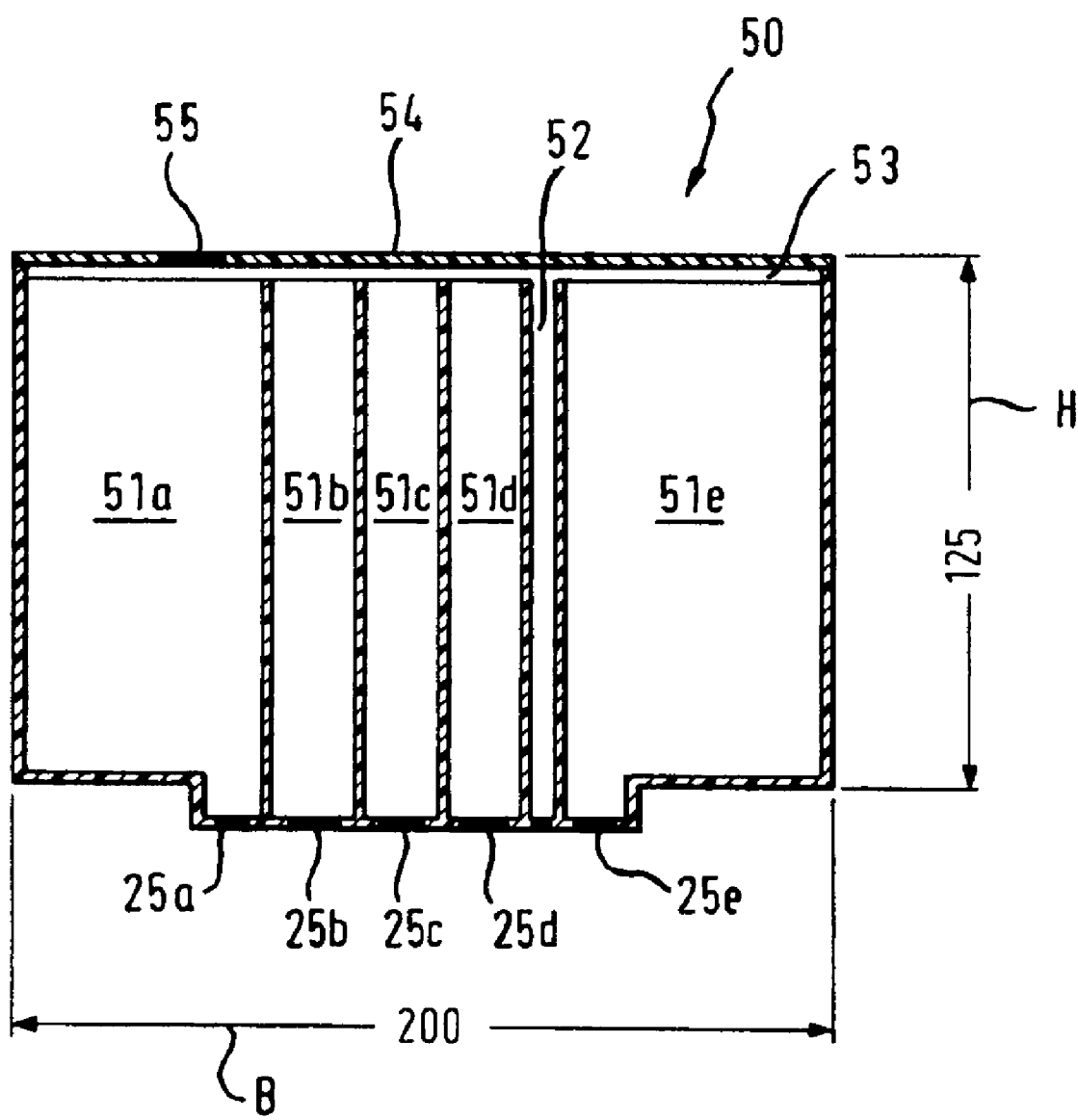

WATER-CONDUCTING DOMESTIC APPLIANCE COMPRISING A DETERGENT DOSING SYSTEM AND CARTRIDGE THEREFOR

BACKGROUND OF THE INVENTION

The invention relates to a water-conducting domestic appliance according to the pre-characterizing clause of claim 1.

The majority of water-conducting domestic appliances currently in use, such as domestic dishwashers, have an adding device for receiving one or more detergent(s) which are added to the washing water during the course of a washing cycle to clean the items for washing that are shelved in the dishwasher. All of the detergent held in the adding device is conventionally dispensed into the washing compartment during the washing cycle and mixed into the washing water circulated therein. In terms of its size, the adding device is dimensioned such that the precise quantity of detergents required for a washing cycle can be poured in. At the start of each washing cycle the user of the dishwasher is therefore required to pour into the adding device the quantity of detergent needed for the washing cycle. This operation is not convenient for the user of the dishwasher. Furthermore, with dishwashers of this kind there is the problem of the quantity of detergents poured into the adding device potentially varying from user to user and also from washing cycle to washing cycle. An incorrectly dosed quantity of detergent can lead to unsatisfactory wash results on the one hand—if an inadequate dose of detergents has been added, and lead to wasting of detergents, and environmental pollution therefore, on the other hand—if an excessive quantity of detergents has been added.

Moreover, adding devices, which add the quantity of detergents stored therein to the washing water in one go, do not allow more complex washing programs to be carried out. Thus for example in certain situations it may be expedient to add the detergent to the washing water at different times. Adding devices, which are designed to receive a single detergent dose, cannot support such complex washing cycles.

Holding a quantity of detergent which is larger than the quantity required for a washing cycle entails the problem of the portion of detergent not added to the washing water being exposed to high temperatures and high differences in temperature with each washing cycle. Stringent demands are therefore placed on the long-time stability of the detergent to maintain the desired cleaning effect.

BRIEF SUMMARY OF THE INVENTION

It is therefore the object of the present invention to develop a water-conducing domestic appliance, in particular a domestic dishwasher, such that the long-time stability of the detergent held in the detergent dosing system is ensured. It is also an object of the invention to provide corresponding auxiliary means.

This object is achieved by a water-conducting domestic appliance as claimed in claim 1. Advantageous developments are recited in the subclaims.

The water-conducting domestic appliance according to the invention, in particular a domestic dishwasher, has a detergent dosing system, the detergent dosing system having a detergent dispenser with a receiving compartment for receiving at least one cartridge, the cartridge being designed to hold at least one detergent. According to the invention it is provided that at least some sections of at least one housing wall of the detergent dosing system have thermal insulation. The detergent dosing system can be designed for multiple dispensing of at least one detergent in this case. The detergent dosing system is designed to be arranged so as to adjoin a washing compartment for example of the dishwasher inside the dishwasher. In this case "so as to adjoin a washing compartment" means that the detergent dosing system is securely integrated in a component of the dishwasher. The detergent dosing system can hold at least one detergent, for example liquid or gel-like detergents. The detergent can be a combination product comprising a plurality of detergent substances or individual detergent substances, such as temperature-sensitive enzymes. The held quantity of each detergent is greater than the quantity required for a washing cycle. The detergent dosing system provides substantially the precise quantity of detergent, in particular according to a program control unit for example, that is required for a washing cycle. For this purpose the detergent dosing system can be connected to a program control unit of the dishwasher. The program control unit can also be connected to various sensors, it being possible to adapt washing programs, such as dosing and composition of detergents, in response to measured values acquired by the sensors.

The long-time stability of the detergents held in the detergent dosing system is ensured by the thermal insulation. It is therefore possible for detergents to be used which have temperature-sensitive substances. The thermal insulation in the section directed toward the washing compartment of the dishwasher prevents or limits excessive variations in temperature in the detergents held in the detergent dosing system. This procedure is particularly advantageous if the held quantity of detergents is designed for a very large total number of washing cycles. The integral component of the dishwasher detergent dosing system according to the invention means the insulation can be adapted to the washing cycles that can be carried out by the dishwasher and the temperature profiles that occur in the process. In particular sections with different degrees of insulation may be provided in this connection.

According to a further embodiment the housing wall is formed by a lid of the detergent dispenser. The lid can be moved between an open position and a closed position, and in particular can be pivoted. Therefore only the lid needs to be provided with the thermal insulation. The lid that is pivotably mounted on the detergent dispenser can be provided as a separate component and therefore be provided with thermal insulation independently of the remainder of the detergent dosing system, for example made from a different material or in some other way.

In a further embodiment the detergent dosing system comprises at least one holding device for holding and fixing at least one cartridge in position. At least one detergent can be held in a cartridge. The provision of the thermal insulation in a housing wall of the detergent dispenser allows inexpensive housing materials to be used for a cartridge in which no particular precautions need to be provided with respect to limiting a flow of heat in the direction of the detergent.

According to a further embodiment the holding device is preferably formed by at least one receiver on the lid of the detergent dispenser. This facilitates insertion and replacement of an empty cartridge on the one hand and a defined cartridge seat is possible on the other hand, so the risk of the detergent dosing system malfunctioning is minimized.

It is also provided that the receiver on the lid has at least two L-shaped holding clips, first sections of the holding clips extending away from a main surface of the lid approximately perpendicularly in each case and on the ends of the first sections that face away from the main surface there are arranged two sections running approximately perpendicularly to these first sections and whose ends that face away from the first sections face each other.

According to a further embodiment the detergent dispenser has a positioning device for at least one cartridge and this forces a predefined seat of the at least one cartridge in the detergent dosing system if the at least one cartridge is arranged in the receiving compartment. The cartridge positioning device ensures that the detergent is added as intended under all circumstances.

The thermal insulation in the section of the detergent dosing system directed toward the washing compartment of the dishwasher can be formed by a volume of gas arranged in the section. Production is possible by way of the gas internal pressure (GIP) process known from the prior art in which a gas pocket is enclosed in the section produced from an injectable material, for example plastics material. The thermal insulation can also be formed by an insulator material arranged in the section. This insulator material can be present in addition to the housing component material. The housing component can also be formed by the insulator material. Combinations of said materials are also possible.

It can be provided that the detergent dosing system has at least one outlet operatively connected to the washing compartment and via which a fixed quantity of detergent can be supplied to the washing water during a washing cycle. The at least one outlet can be provided on the detergent dispenser. However it is also conceivable for the at least one outlet to be arranged on the cartridge.

It is expedient if the at least one outlet is provided on a housing section of the detergent dispenser which is disposed below the receiving compartment in the direction of gravity. A number of outlets is provided in this case which matches the number of detergents held in the cartridge or the number of cartridge chambers.

According to a further embodiment a number of dosing chambers is provided that matches the number of outlets. The at least one outlet of the detergent dosing system ends in one of the dosing chambers which is operatively connected to the detergent.

The detergent dosing system can comprise a conveying device with which the detergent can be supplied from the cartridge to the washing compartment. It is expedient in this connection if the conveying device is arranged in the dosing chamber.

In one variant the at least one detergent can be dosed by a pump. In a further variant the at least one detergent is dispensed via gravity and dosing takes place by fixing an emptying time in which the at least one detergent can be transferred from the cartridge for further processing by opening an openable closure. In this variant the openable closure is arranged at the bottom in the direction of gravity when the cartridge is fitted in the detergent dosing system.

According to a further embodiment the detergent dosing system has at least one additional chamber for a solid detergent. The provision of an additional chamber for a solid detergent has the advantage that operation of the dishwasher can even be ensured when the cartridge no longer contains detergent and the user does not have any more filled cartridges available.

According to one variant the detergent dosing system is arranged in a side wall of the washing compartment, between a top rack and a bottom rack of the dishwasher. Alternatively the detergent dosing system can be arranged on a door of the dishwasher designed so as to pivot with respect to the washing compartment. The detergent dosing system is an integral component of the dishwasher in this case. In this variant the construction on the door is also such that, when the door is open, the detergent dispenser is fitted with the cartridge from the end face of the door. The cartridge can be fitted in the region of a door cover or an inner door of the dishwasher door in this case.

The invention also includes a cartridge designed for use in a dishwasher according to the invention and comprising a detergent dosing system. The cartridge has a housing for receiving at least one detergent, the held quantity of detergents being greater than the quantity required for a washing cycle. The housing can have side walls and a base and top. According to the invention the cartridge has thermal insulation which limits a flow of heat from the washing compartment of a dishwasher in the direction of the detergent dosing system. The cartridge according to the invention has the same advantages as have been described above in connection with the detergent dosing system.

The thermal insulation can be formed by a volume of gas arranged in the section, produced for example using the gas internal pressure process, or by an insulating material arranged in the section. This can be present in addition to the cartridge housing material. The housing section of the cartridge can also be formed by the insulator material itself.

According to one embodiment the cartridge contains at least one detergent. The detergent can be arranged in a plurality of cartridge chambers. Holding different detergents in different chambers has the advantage that in a certain stage of a washing cycle only the detergent which is actually necessary for this washing stage needs to be added. Of course it is also possible for a plurality of detergents to be added simultaneously during a certain stage of a washing cycle. If two different detergents are added to the washing water at basically the same time during a washing cycle it is also possible to arrange these detergents in a common chamber of the cartridge.

According to a further embodiment the volume of at least one detergent is such that a total of between 20 and 40, preferably 30, washing cycles can be carried out. The volumes of the individual detergents are preferably such that with the last washing cycle all of the detergents held in the cartridge are used up.

A further embodiment provides that the cartridge comprises at least one conveying device with which detergent can be conveyed into the washing compartment of a dishwasher. The result of this procedure is that the detergent dispenser of the detergent dosing system according to the invention can have a particularly simple construction. According to this embodiment the devices required to dose the detergents held in the cartridge into the washing compartment are held exclusively in the cartridge. In this connection it may be provided that a number of conveying devices that matches the number of detergents or chambers is provided.

To prevent incorrect insertion of the cartridge in the detergent dispenser the cartridge housing has a mechanical coding which is formed for example by projections or guides. The coding is configured in such a way that the cartridge may only be inserted in one way—the intended way—into the detergent dispenser.

The cartridge can have any suitable shape. However it is preferably provided that the cartridge housing has a longitudinal extension along a main axis. This can for example be a right parallelepiped basic body with a longitudinal axis, for example along the width, which is substantially longer than all other axes (along the depth and height). However it can also be a conical, truncated cone-shaped, cylindrical, pyramidal or truncated pyramid-shaped basic body with a main axis.

It is preferable for the main axis to be longer than minor axes of the housing with one of the above-mentioned basic shapes of the cartridge, for example by a factor of at least 1.5. The basic body can also preferably have an extension along a first minor axis, for example along the height, and an extension along a second minor axis, for example along the depth, the extension along the first minor axis being substantially longer than the extension along the second minor axis, for example by a factor of 5 to 10, preferably 5. Particularly good handling of the cartridge and an expedient volume of the respective detergents result if the cartridge housing has a right parallelepiped basic shape with a depth of about 25 mm, a width of about 200 mm and a height of about 125 mm. In particular the preferred total number z of washing cycles of between 20 and 40, preferably 30, washing cycles may be achieved with these dimensions.

In a preferred development it is provided that the chambers of the cartridge are arranged side by side along the main axis. In other words, with a cartridge with a right parallelepiped basic shape and main axis extending in the direction of the width, the division into chambers leads to chamber dimensions in which the dimension of a chamber is a fraction of the width that matches the number of chambers while all chambers have the same depth and height.

According to a further embodiment the cartridge is provided with an openable closure which can be opened, in particular automatically, when the cartridge is inserted in the detergent dosing system and can be closed, in particular automatically, when the cartridge is removed from the detergent dosing system. The openable closure can for example be formed by a membrane, film or an elastomer. During storage and transportation the closure serves to prevent the detergent held in the cartridge from unintentionally running out. The closure is opened at the instant at which the cartridge is inserted in the detergent dispenser of the detergent dosing system, so during further operation of the dishwasher it is possible to add the detergent to the washing water. The number of closures can vary according to the construction of the cartridge. Expediently a number of closures is provided that matches the number of cartridge chambers; the number of closures can also match the number of detergents in the cartridge. The openable closure can for example be arranged at the bottom in the direction of gravity, i.e. on the base of the cartridge when the cartridge is fitted in the detergent dosing system. This facilitates complete emptying of the cartridge by the conveying device, so no detergent remains unused in the cartridge.

According to a further embodiment, when the cartridge is inserted in the detergent dosing system the openable closure is arranged so as to correspond with a cannula, so the closure is penetrated by it. The cannula is fixed in the detergent dispenser and establishes a connection to the dosing chamber.

It is preferably provided that at least one of the chambers has at least one of the following ingredients: alkali carriers, for example alkaline solution, complexing agents and dispersants; for example polymers; enzymes such as amylase, protease or lipase; bleaching agents, for example hydrogen peroxide; bleaching activators, and surfactants, such as non-ionic surfactants. The chambers can also hold a biocidal liquid. In particular they can hold biocides against bacteria (bactericides), against fungi (fungicides), against microorganisms (microbicides), against viruses (virucides) and against algae (algicides), of which the addition prevents unpleasant smells from forming by for example biofilm formation during relatively long service lives.

A detergent dosing system also forms part of the invention.

BRIEF DESCRIPTION OF THE DRAWINGS

The invention will be described in more detail hereinafter with reference to the figures, in which:

FIG. 5 shows a section through a detergent dosing system arranged in the dishwasher door, FIG. 6 shows an exemplary embodiment of a cartridge for use in a detergent dosing system according to the invention.

DETAILED DESCRIPTION OF THE PRESENT INVENTION

Figure 1:
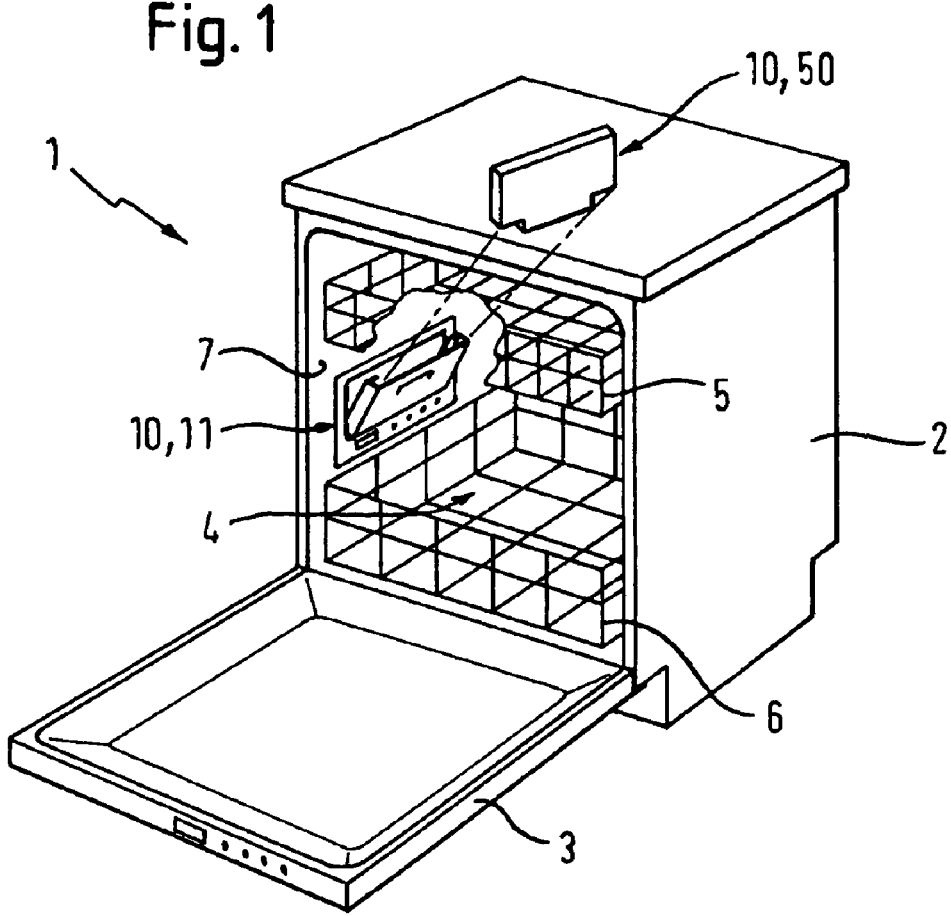
FIG. 1 shows a dishwasher according to the invention comprising a detergent dosing system which is arranged in a receptacle wall.

FIG. 1 shows a dishwasher 1 according to the invention comprising a door 3 pivotably mounted on a housing 2. The figure shows the door 3 in its open position. Crockery racks 5, 6 are arranged in a known manner in a washing compartment 4 that can be closed by the door 3. A detergent dosing system 10, comprising a detergent dispenser 11 and a cartridge 50, which contains at least two detergents that are held separately from each other, is arranged in a receptacle wall 7 of the housing 2. FIG. 1 shows the preferred arrangement of the detergent dosing system 10 between the top rack 5 and the bottom rack 6. The detergent dispenser 11 that receives the cartridge 50 is arranged in a section of the receptacle wall 7 that is located close to the door opening in order to facilitate introduction and removal of the cartridge 50 into or from the detergent dispenser 11 for the user.

Figure 4:
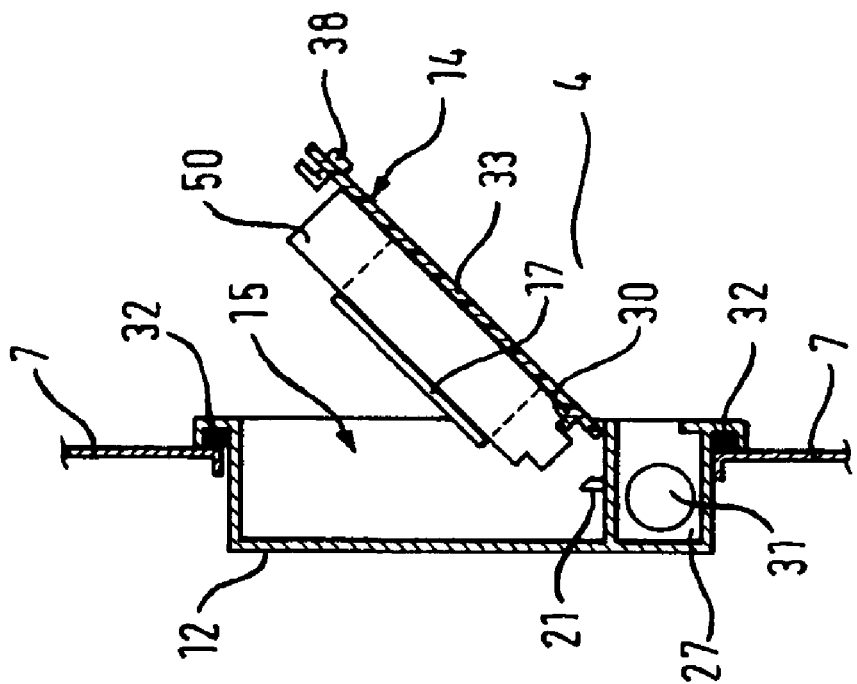
FIG. 4 shows a cross-section through the detergent dosing system shown in FIG. 3.
Figure 3:
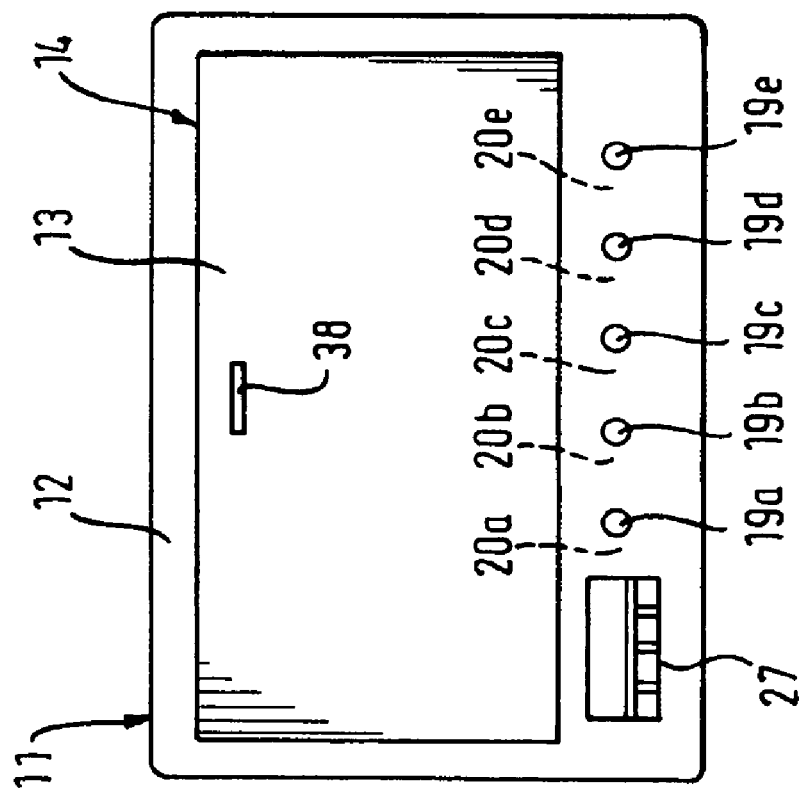
FIG. 3 shows a plan view of a detergent dosing system according to the invention for arrangement in a receptacle wall of the dishwasher.

FIG. 3 and FIG. 4 show a plan view and a cross-section through the detergent dosing system 10, as is used in the dishwasher according to FIG. 1. FIG. 3 shows the detergent dispenser 11 arranged in the receptacle wall. This comprises a housing 12 and a lid 14 mounted so as to pivot with respect to the housing 12. If, as shown in FIG. 4, the lid 14 is in its open position the cartridge 50 can be inserted from the washing compartment 4 into a position the holds cartridge 50 against the lid 14, whereby the lid 14 can then pivotally close to incorporate cartridge 50 into housing 12. For holding and fixing cartridge 50, the lid 14 has a holding device, for example, two symmetrically arranged holding clips 17 which have an L-shape and are adapted to the size of the cartridge 50, so that, following insertion, the holding clips 17 surround the cartridge 50 so as to hold it. A supporting surface 30 is also formed on the lid 14 so that the cartridge 50 comes to rest in a defined position. Closing the lid 14 inserts the cartridge in a receiving space 15 of the detergent dispenser 11 and it is pressed into its final position by optionally present lugs and/or projections on the detergent dispenser housing.

As may easily be seen from the cross-section of FIG. 4, the external periphery of the housing 12 of the detergent dispenser 11 has a bend. The bend serves to receive a seal 32 which is inserted between the bend and the receptacle wall 7. This prevents water or moisture from penetrating in the direction of the back of the receptacle wall 7.

FIG. 6 shows an exemplary embodiment of the cartridge 50. The cartridge 50 has, merely by way of example, five chambers 51a, 51b, 51c, 51d and 51e for receiving one detergent or a detergent mixture respectively. The size of the individual chambers 51a to 51e is preferably dimensioned so as to match the volume required during a predefined number of washing cycles. The volume of the various detergents in chambers 51a to 51e is preferably dimensioned such that after a specific number of washing cycles, preferably between 20 and 40, more preferably about 30, all of the chambers 51a to 51e are completely emptied. Each of the chambers 51a to 51e is provided with an openable closure 25a to 25e in the form of a membrane. The membrane, made for example from a rubber, closes the individual chambers 51a to 51e so as to seal them, so during storage and transportation of the cartridge 50 no detergent can escape from it. During insertion of the cartridge 50 in the detergent dispenser 11 the membranes are pierced by cannulas 21 (cf. FIG. 4) correspondingly arranged in the detergent dispenser 11, so detergent can be added to the washing compartment according to an appropriate dosing mechanism.

The cartridge is preferably made from a plastics material and has a width B of about 200 mm, a height H of about 125 mm, and a depth of about 25 mm. With these sizes the volume of the various chambers may be dimensioned such that the desired 20 to 40 washing cycles can be carried out by means of one cartridge.

In addition to the chambers 51a to 51e the cartridge 50 has an additional chamber 52 which is connected to one or more ventilation duct(s) 53. The ventilation duct(s) in turn have a connection to the various chambers 51a to 51e. This ensures that as the chambers 51a to 51e increasingly empty, a vacuum cannot build up in them, making it difficult to add detergent or adulterate it. The ventilation ducts 53 are preferably located in a lid 54 which is provided on the cartridge housing following filling of the individual chambers 51a to 51e with the respective detergents. The lid 54 can have a pressure relief valve 55 which is optionally required in the case of certain detergent components.

As the detergent contained in the cartridge 50 is only added gradually to the washing compartment within the framework of a plurality of washing cycles, more precisely to the washing water circulated in the washing compartment, they are exposed to significant absolute temperatures and variations in temperature with every washing cycle. To prevent the properties of the detergent from changing over time as a result of this, at least one housing wall of the cartridge 50 directed toward the washing compartment and/or the lid 14 of the detergent dosing system 10 directed toward the washing compartment is made from an insulating material or surrounded by an insulation 33. A flow of heat from the washing compartment in the direction of the detergent dosing system or the detergents held in the cartridge is limited hereby, ensuring the long-time stability of the detergents used. The insulation 33 can be formed by a volume of gas arranged in the lid or the relevant housing section of the cartridge. This volume of gas that generates the insulation can be introduced during manufacture of the lid or cartridge. The method used in this connection is known as the gas internal pressure process (GIP).

Reference will again be made in the description below to FIGS. 3 and 4. In addition to the receiver for the cartridge the detergent dispenser 11 has an additional chamber 27 for receiving a solid detergent. The solid detergent can for example be a 3-in-1 tab which is placed in the additional chamber 27 if there is no cartridge 50 or an empty cartridge 50 in the receiving compartment 15. The provision of an additional chamber 27 for receiving a solid detergent allows the dishwasher to be used even if the cartridge 50 is empty and no filled cartridge is available.

The detergent dosing system can have means for scanning the level of detergent in the cartridge to detect an empty or nearly empty cartridge. If the detergent in one or more chamber(s) of the cartridge reaches a predefined level, for example if a predefined number of washing cycles is still possible, then this can be shown to the user by way of an optical signal. The display mechanism can be located on the outside of the door, for example the cover, in a known manner.

The level can be scanned optically, capacitively or acoustically. With optical scanning an optical fiber could be inserted in the cartridge which scans the level via a light source present in the detergent dispenser. With capacitive scanning the detergent in the cartridge can be used as a dielectric. Acoustic coupling can take place by using the piezo ultrasound principle. Alternatively a counter for counting the washing cycles of a full cartridge that have already been run through can be used. To detect a new cartridge it can be provided with a transponder that can be read by the dishwasher or the detergent dispenser. Alternatively a different code, for example a bar code, can be provided on the cartridge. The code can be read as the cartridge is inserted in the detergent dispenser.

The additional chamber 27, as may be seen from FIG. 4, has an opening 31 which is connected to the dishwasher surroundings. For this purpose the opening 31 can be connected to the surroundings via channels (not shown in the figures) which run on the back of the receptacle wall 7. The detergent dosing system thereby integrates the functionality of what is known as an "expansion opening", which is used for disposing of the overpressure produced in the washing compartment if the dishwasher is opened and closed again by the user, for example during a washing cycle with washing water that has already been heated. The overpressure produced in this instant can then be dissipated to the surroundings via the additional chamber 27 and the opening 31.

Outlets 19a to 19e are also provided in the housing 12 of the detergent dispenser 11. The outlets 19a to 19e each end in a dosing chamber 20a to 20e, only dosing chamber 20a being visible in the cross-section in FIG. 7. The dosing chamber 20a is connected via the cannulas 21a to chamber 51a of the cartridge.

Figure 7:
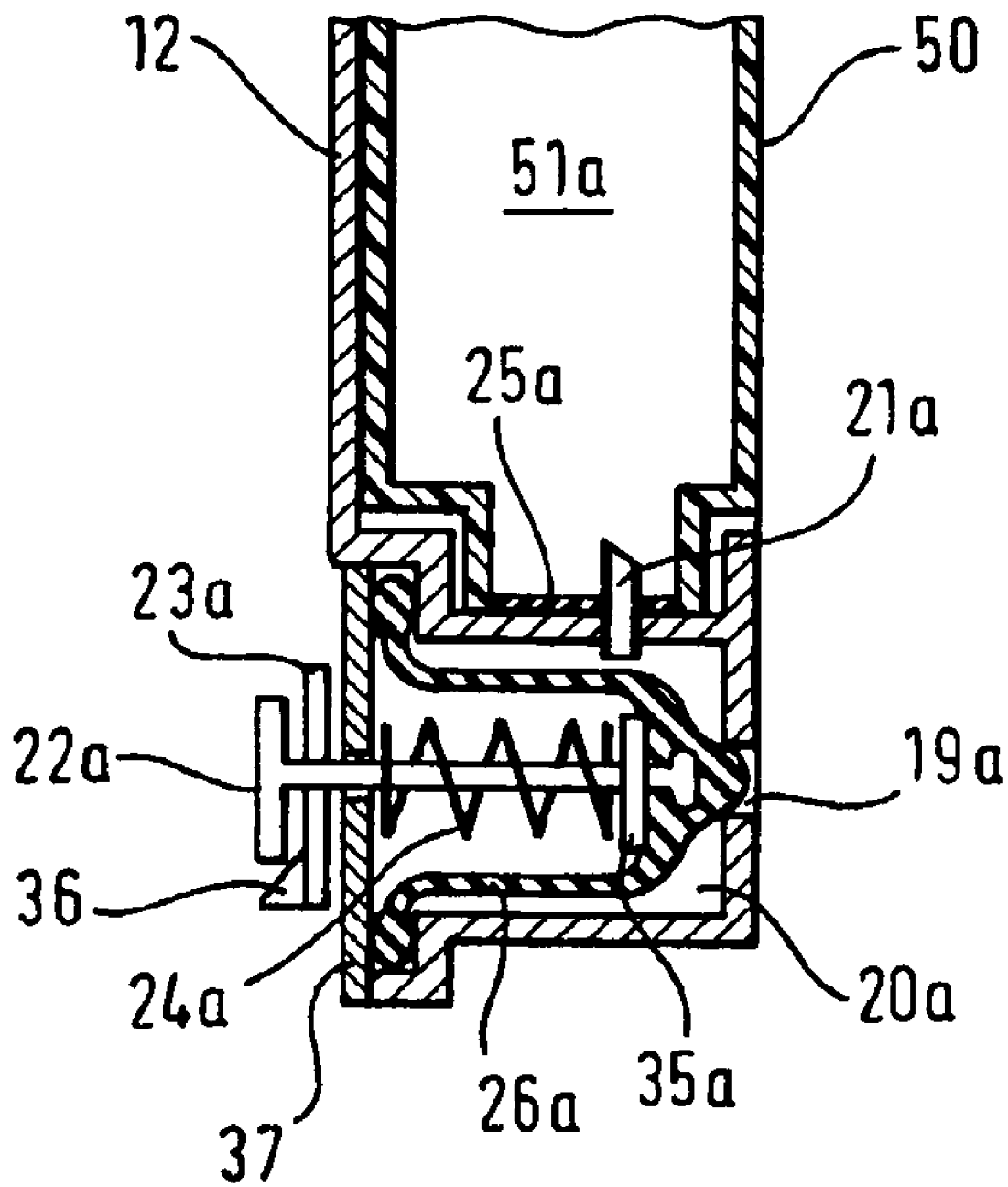
FIG. 7 shows a section through a detergent dosing system according to the invention, a conveying device arranged in a dosing chamber being shown with which detergent can be supplied from the cartridge to the washing compartment of the dishwasher.

Arranged in each of the dosing chambers 20a to 20e is a conveying device which in the present exemplary embodiment comprises a seal 26a, mounted so it can move in the dosing chamber 20a, and a driving mechanism for the seal 26a. The seal 26a is shaped in such a way that it can be moved between a position closing the associated outlet (for example, as shown in FIG. 7 as element 19a) and the position unblocking the outlet. For this purpose the seal 26a is connected to a valve lifter 22a actively connected to a valve actuation lever 23a. When the valve actuation lever 23a is operated the seal 26a is moved away from the outlet 19a. If the valve actuation lever 23a is moved back to its original position, a restoring force is built up by a spring 24a, tensioned between a housing cover 37 and an abutment 35a provided on the valve lifter 22a, which positions the seal 26a intimately on the outlet 19a.

If the seal 26a is in its open position, the detergent in the chamber 51a can pass through the cannula 21a into the dosing chamber 20 and via the outlet 19a into the washing compartment as a result of gravity or an active conveying device, such as a pump for example.

In this case the detergent can be conveyed either solely by using gravity or the conveying device, in particular the design of the seal, can also be constructed according to the pump principle, so detergents are conveyed by a corresponding vacuum from the detergent chamber 21a into the dosing chamber 20a and by a corresponding overpressure from the dosing chamber 20a into the washing compartment.

Figure 2:
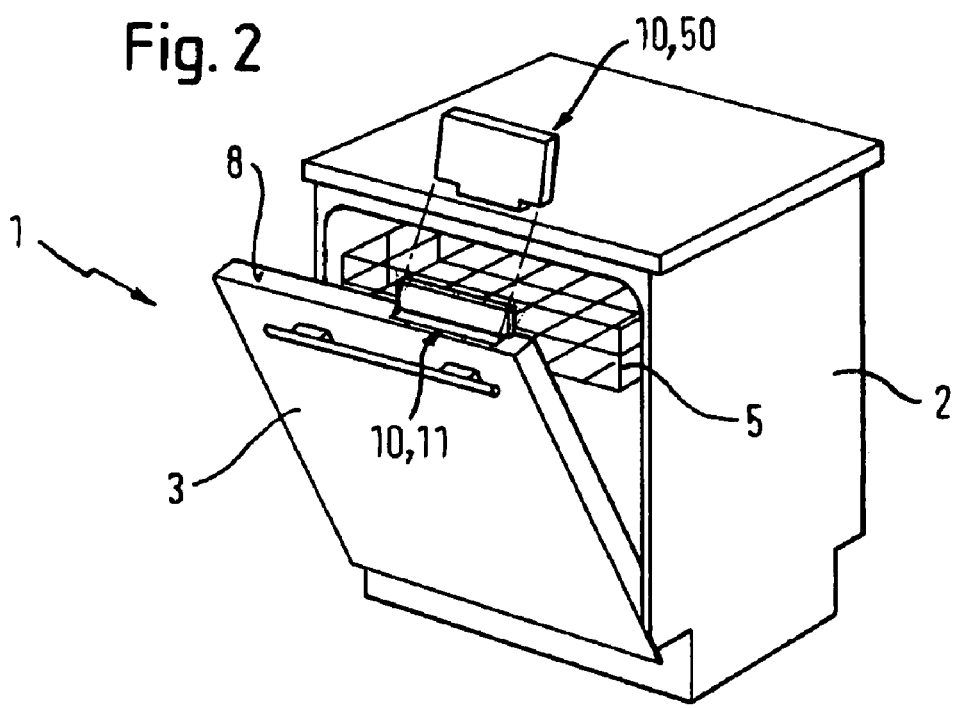
FIG. 2 shows a further dishwasher according to the invention comprising a detergent dosing system which is arranged in the dishwasher door.

FIG. 2 shows a further dishwasher 1 with a detergent dosing system 10 according to the invention. In contrast to the previously described exemplary embodiment the detergent dosing system 10, more precisely the detergent dispenser 11, is arranged in the dishwasher door 3.

The detergent dispenser 11 is fitted with the cartridge 50, which, moreover, can be constructed so as to be identical to that described in connection with FIG. 6, from the end face 8 of the door. The opening for fitting the detergent dispenser 11 can be arranged in the region of a dishwasher cover or the inner door of the door. The advantage of the arrangement according to FIG. 2 lies in more convenient insertion and removal of the cartridge for the user.

The cross-section of FIG. 5 shows the configuration of the detergent dosing system 10 in more detail. A section through the door 3 of the dishwasher shown in FIG. 2 is shown. The detergent dispenser 11 is arranged between a cover 34 and an inner door 28. In a known manner the cover 34 adjoins the outer door 29 that is visible to the user from the outside. In the region of its end face the detergent dispenser 11 has a lid 14 which is pivotably mounted on the housing 12 of the detergent dispenser 11. The lid 14 has two latching hooks of which the one which is located closer to the pivot axis engages in a projection formed on the cartridge 50. When the lid is pivoted this brings about slight lifting of the cartridge 50 for easier removal for the user. The latching hook located further away from the pivot axis is used to lock the lid 14 to the housing 12.

When the lid 14 is closed and the cartridge 50 inserted, the cartridge is pressed downwards by the lid and the relative movement of the latching hook and projection on the cartridge 50, so the cannulas provided in the detergent dispenser 11 pierce the membranes 25a to 25e correspondingly arranged in the cartridge 50. As has been described by way of example in connection with FIG. 7, a respective dosing chamber is arranged below the cannula 21 and is connected to the washing compartment by corresponding outlets 19a to 19e.

The housing wall of the detergent dispenser identified by reference numeral 13 and/or the housing wall of the cartridge 50 adjoining this wall, are equipped with insulation, as described above, to limit a flow of heat from the washing compartment in the direction of the detergent dosing system or the detergent in the cartridge.

The present invention produces a dishwasher which facilitates handling for its user and, at the same time, ensures, independently of the quantity of detergents held in the detergent dosing system, long-time stability of the detergents so the desired cleaning effect is properly achieved.

LIST OF REFERENCE NUMERALS 1 dishwasher
2 housing
3 door
4 washing compartment
5 crockery rack
6 crockery rack
7 receptacle wall
8 end face of door
10 detergent dosing system
11 detergent dispenser
12 housing
13 housing wall
14 lid
15 receiving compartment
16 holding device
17 holding clip
18 pivoting mechanism
19a-19e outlet
20a-20e dosing chamber
21a-21e cannula
22a-22e valve lifter
23a-23e valve actuation lever (rotary disc)
24a-24e spring
25a-25e membrane
26a-26e seal
27 chamber for solid detergent
28 inner door
29 outer door
30 stop/supporting surface
31 opening
32 seal
33 insulation
34 cover
35a-35e abutment
36 projection
37 lid
50 cartridge
51a-51e chamber for detergent
52 chamber for ventilation
53 ventilation duct
54 lid
55 pressure relief valve
H height
B width

The invention claimed is:

1. A water-conducting domestic appliance comprising:
a washing compartment; and
a detergent dosing system, the detergent dosing system having a detergent dispenser with a lid and a receiving compartment, the receiving compartment for receiving at least one cartridge that is configured to hold at least one detergent, and wherein the lid includes at least one holding device formed on the lid and configured to hold and fix the at least one cartridge in a predetermined position on the lid in each of an open and closed position, the detergent dosing system being formed from a plurality of housing walls and at least one portion of at least one housing wall of the detergent dosing system having thermal insulation.

2. The water-conducting domestic appliance according to claim 1, further wherein the holding device includes at least two L-shaped holding clips.

3. The water-conducting domestic appliance according to claim 1 wherein at least one outlet is formed on the detergent dispenser.

4. The water-conducting domestic appliance according to claim 3 wherein the at least one outlet is arranged on a housing section of the detergent dispenser which is disposed below the receiving compartment in the direction of a gravitational pull.

5. The water-conducting domestic appliance according to claim 3 wherein the at least one outlet is equal in number to the at least one detergent held in the at least one cartridge.

6. The water-conducting domestic appliance according to claim 5 and further comprising a plurality of dosing chambers equal in number to the at least one outlet.

7. The water-conducting domestic appliance according to claim 6 wherein at least one outlet of the detergent dosing system ends in one of the dosing chambers.

8. The water-conducting domestic appliance according to claim 1 and further comprising a conveying device for conveying at least one detergent out of the at least one cartridge.

9. The water-conducting domestic appliance according to claim 8 wherein the conveying device is disposed in a dosing chamber.

10. The water-conducting domestic appliance according to claim 1 and further comprising at least one pump for dosing the at least one detergent.

11. The water-conducting domestic appliance according to claim 1 wherein the at least one detergent is delivered by gravity through an openable closure.

12. The water-conducting domestic appliance according to claim 11 wherein the openable closure is configured substantially at the bottom of the detergent dispenser for delivery of the at least one detergent.

13. The water-conducting domestic appliance according to 1 wherein the detergent dosing system includes at least one additional chamber for a solid detergent.

14. The water-conducting domestic appliance according to claim 1 wherein the detergent dosing system is disposed in a side wall of a washing compartment of the water-conducting domestic appliance.

15. The water-conducting domestic appliance according to claim 1 wherein the detergent dosing system is disposed between a top rack and a bottom rack of the water-conducting domestic appliance.

16. The water-conducting domestic appliance according to claim 1 wherein the detergent dosing system is pivotably disposed on a door of the water-conducting domestic appliance.

17. The water-conducting domestic appliance according to claim 16 wherein the detergent dosing system is configured on the door such that the detergent dispenser is fitted with a cartridge from an end face of the door.

18. The water-conducting domestic appliance according to claim 17 wherein the detergent dispenser is fitted in at least one of a region of an inner side of the door and in a region of a cover of the door.

19. The water-conducting domestic appliance of claim 1, further comprising a supporting surface configured to support the at least one cartridge in an inserted position against the lid when the lid is in either of an open or closed position.

\* \* \* \* \*

UNITED STATES PATENT AND TRADEMARK OFFICE
CERTIFICATE OF CORRECTION

PATENT NO.       : 8,381,744 B2  
APPLICATION NO. : 12/311093  
DATED            : February 26, 2013  
INVENTOR(S)      : Classen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1015 days.

Signed and Sealed this

First Day of September, 2015

Michelle K. Lee  
*Director of the United States Patent and Trademark Office*